Feb. 3, 1925.                                              1,524,831
J. F. McCLEARY
ANIMAL TRAP
Filed May 15, 1924
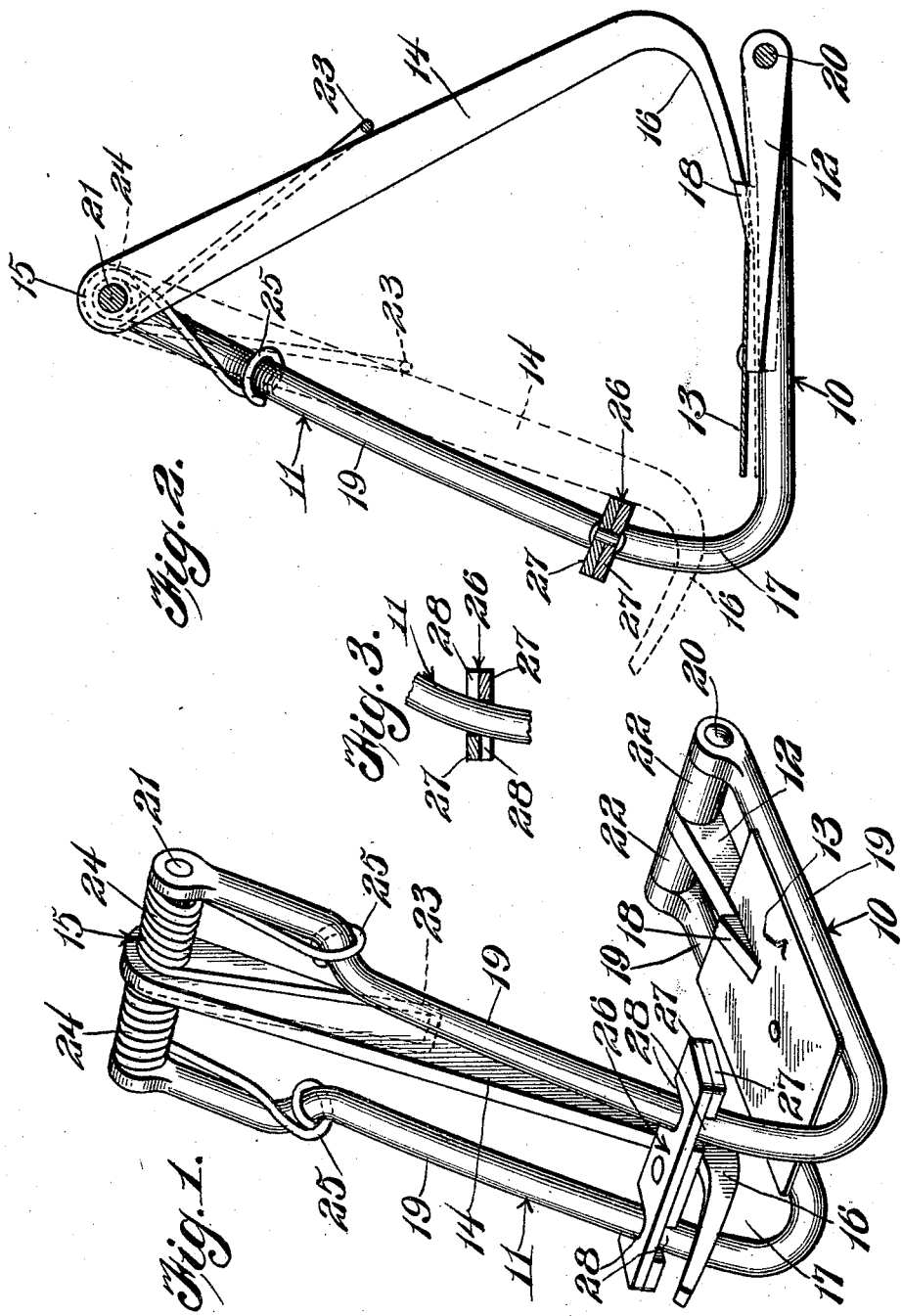
INVENTOR
John F. McCleary
Watson E. Coleman
ATTORNEY Patented Feb. 3, 1925.

1,524,831

UNITED STATES PATENT OFFICE.

JOHN F. McCLEARY, OF DALLAS CITY, ILLINOIS.

ANIMAL TRAP.

Application filed May 15, 1924. Serial No. 713,570.

*To all whom it may concern:*

Be it known that I, JOHN F. McCLEARY, a citizen of the United States, residing at Dallas City, in the county of Hancock and State of Illinois, have invented certain new and useful Improvements in Animal Traps, of which the following is a specification, reference being had to the accompanying drawings.

This invention relates to improvements in animal traps and more particularly to that type of trap generally designated as a choker trap and which is intended for placement at the mouth of the den or burrow of an animal or in the run-way of an animal, to have its jaws arranged upon opposite sides of said run-way and clamp together upon the animal as it passes therethrough.

An important object of the invention is to provide in a device of this character a trap employing, instead of the usual trigger, a pan of considerable width so arranged that any animal contacting the same lies in the path of a movable jaw which when released sweeps immediately above the pan with great force.

A further object of the invention is to provide a device of this character having a considerable jaw spread permitting its use with larger bodied animals than such traps may be ordinarily employed in capture of and which is so constructed that regardless of the size of the body of the animal it is firmly held against escape.

A still further object of the invention is to provide a device of this character in which the springs of the trap are held in well spaced relation to the ground so that they do not derive dampness therefrom tending to rust or destroy the same.

These and other objects I attain by the construction shown in the accompanying drawings, wherein for the purpose of illustration is shown a preferred embodiment of my invention and wherein:—

Figure 1 is a perspective view of a trap constructed in accordance with my invention, the same being shown in the sprung position;

Figure 2 is a vertical sectional view through the trap, the trap being shown in solid lines and set and in dotted lines in the sprung position;

Figure 3 is a detail sectional view showing the manner of assembling the limiting bar 26.

Referring now more particularly to the drawings, the body or frame of the trap consists of an L-shaped member one arm 10 of which forms the base and the other arm 11 of which extends upwardly from the base and preferably inclines over the base for a purpose presently to appear. To the free end of the arm 10 is pivoted a latch 12 to which is secured a pan 13 downward movement of which is limited by its engagement with the base 10. To the free end of the arm 11 is pivoted a movable jaw 14 having associated therewith a spring 15 constantly urging the jaw toward the vertical arm 11, said movable jaw having at its lower end an angular portion 16 terminating in a relatively sharp point. This angular portion is directed toward the arm 11 and which angular portion, when the arm 11 is released from the pan, extends through an opening 17 formed in the arm 11. The pointed end of this angular extension is adapted to engage against the holding shoulder 18 of the latch 12 to maintain the lower ends of the jaws 11 and 14 in spaced relation and the pan 13 elevated. Upon the application of pressure to the pan tending to depress the same the pointed end is released from the shoulder 18 and under the influence of the spring sweeps above the upper surface of the pan engaging any animal which may depress the pan and forcing the same into engagement with the arm 11.

The construction of the various parts of the device is capable of a considerable range of change and modification. The form herein illustrated is a preferred form of construction of my device. In this form the L-shaped member is produced by providing a pair of L-shaped side members 19 the ends of the arms of which are held in spaced relation by pivot bolts 20 and 21. On the pivot bolt 20 the latch 12 is pivoted at its center, the latch being held centrally disposed by means of sleeves 22 arranged in opposite sides thereof between the side members 19. To the pivot bolt 21 the movable jaw 14 is pivoted and is held in central position by means of the spring shifting the jaw. These springs are produced by employing a single length of material and bending the central portion thereof to provide a jaw engaging bight 23. The ends of this central portion are then oppositely coiled, as at 24, and the extremities thereof are provided with hooks 25 for engagement with the vertical arms of the side members 19. The side members 19 adjacent the lower ends of the vertical arms thereof are connected by a transverse bar 26, in the present instance constructed by employing two plates 27 having notches 28 in one side thereof corresponding in spacing to the spacing of the vertical arms oppositely engaging these plates with the arms so that their notches are oppositely directed in securing the plates together. This construction is more fully shown in Figure 3. The space beween these arms and beneath this cross member 26 provides the opening 17 through which the point or angular portion 16 is directed when the movable jaw is sprung.

It will be obvious that in a trap of this character the chances of escape of an animal which has engaged in the jaws of the trap are reduced to a minimum and that the construction is such that the trap is readily set and when in the set position has its operating springs so held that they are not exposed to the dampness of the ground. It will furthermore be obvious that, as above set forth, many changes are possible in the construction employed to produce the general structure first described and I accordingly do not limit myself to the specific structure illustrated except as hereinafter claimed.

I claim:—

1. A trap comprising an L-shaped frame one arm of which forms the base of the trap and the other arm of which extends vertically, a movable jaw pivoted to the upper end of the last named arm and swinging over the base, a spring engaged with the upper end of the movable jaw and normally maintaining its free end in engagement with the last named jaw, a latch pivoted to the free end of the first named jaw having a shoulder with which the free end of the movable jaw operatively engages to be thereby maintained in set position, said movable jaw having at its free end an angular projection directed toward the last named arm of the frame and sweeping immediately above the base during movement of the jaw from set to sprung position.

2. A trap comprising an L-shaped frame one arm of which forms the base of the trap and the other arm of which extends vertically, a movable jaw pivoted to the upper end of the last named arm and swinging over the base, a spring engaged with the upper end of the movable jaw and normally maintaining its free end in engagement with the last named jaw, a latch pivoted to the free end of the first named jaw having a shoulder with which the free end of the movable jaw operatively engages to be thereby maintained in set position, said movable jaw having at its free end an angular projection directed toward the last named arm of the frame and sweeping immediately above the base during movement of the jaw from set to sprung position, said last named arm being provided with an opening through which said angular portion extends when the trap is in the sprung position.

3. A trap comprising an L-shaped frame one arm of which forms the base of the trap and the other arm of which extends vertically, a movable jaw pivoted to the upper end of the last named arm and swinging over the base, a spring engaged with the upper end of the movable jaw and normally maintaining its free end in engagement with the last named jaw, a latch pivoted to the free end of the first named jaw having a shoulder with which the free end of the movable jaw operatively engages to be thereby maintained in set position, said L-shaped frame comprising spaced L-shaped side members connected at the free ends of the arms thereof by members affording pivots for said movable jaw and latch, and a bar connecting and maintaining in spaced relation said side members at a point adjacent the lower end of the vertical arms thereof.

4. A trap comprising an L-shaped frame one arm of which forms the base of the trap and the other arm of which extends vertically, a movable jaw pivoted to the upper end of the last named arm and swinging over the base, a spring engaged with the upper end of the movable jaw and normally maintaining its free end in engagement with the last named jaw, a latch pivoted to the free end of the first named jaw having a shoulder with which the free end of the movable jaw operatively engages to be thereby maintained in set position, said L-shaped frame comprising spaced L-shaped side members connected at the free ends of the arms thereof by members affording pivots for said movable jaw and latch, and a bar connecting and maintaining in spaced relation said side members at a point adjacent the lower end of the vertical arms thereof, said spring comprising a single length of spring metal bent centrally to form a jaw engaging bight and at the ends of the bight portion to form oppositely directed coils surrounding the pivot member at opposite sides of the movable jaw, the terminal portions of said coils being secured to the adjacent side members.

In testimony whereof I hereunto affix my signature.

JOHN F. McCLEARY.